June 14, 1960     W. A. CRANE     2,940,644
FEEDER FOR FILTERING MATERIALS
Filed July 22, 1957     3 Sheets-Sheet 1

INVENTOR.
WILLIAM A. CRANE.
BY
Lockwood, Galt, Woodard & Smith
ATTORNEYS.

June 14, 1960 W. A. CRANE 2,940,644
FEEDER FOR FILTERING MATERIALS
Filed July 22, 1957 3 Sheets-Sheet 2
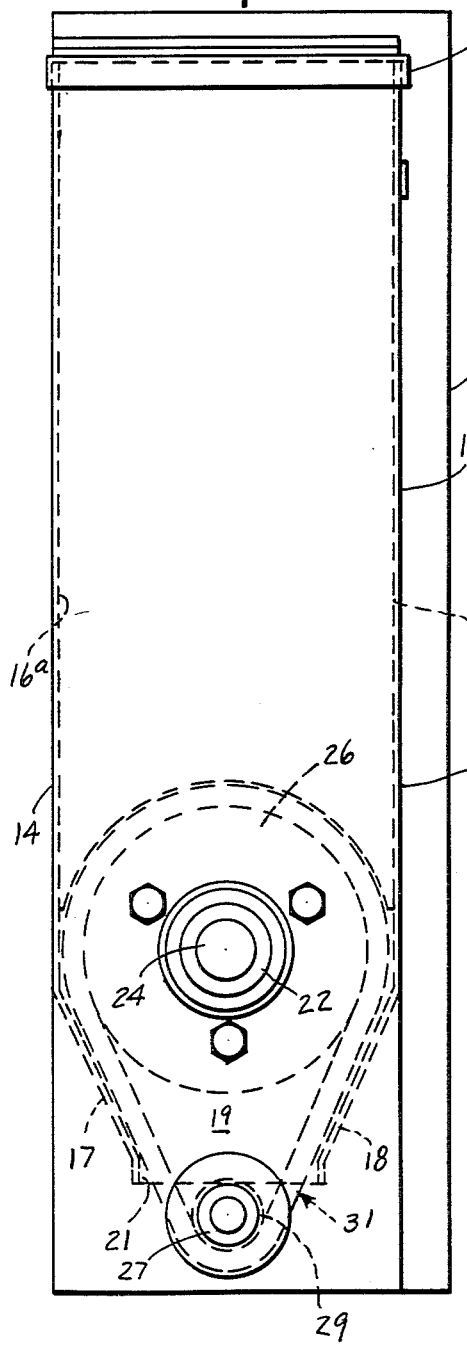
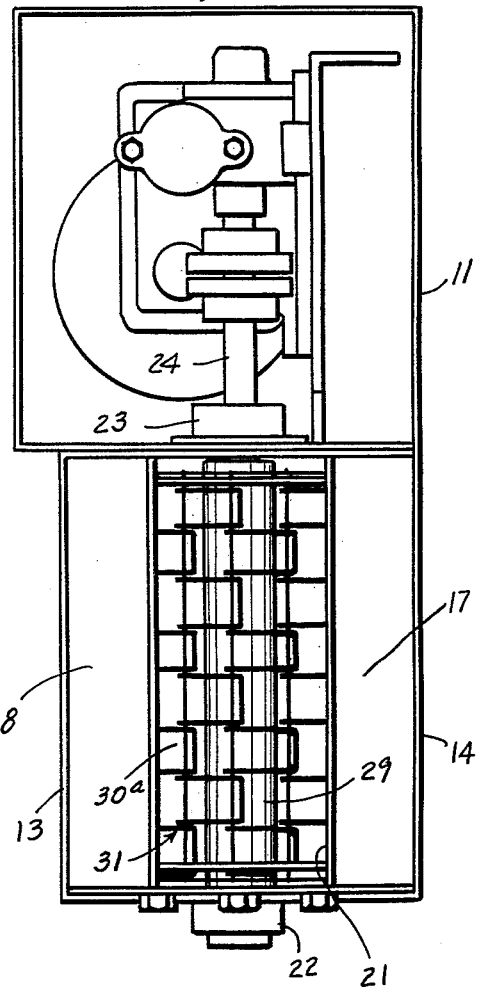
INVENTOR.
WILLIAM A. CRANE.
BY
Lockwood, Galt, Woodard + Smith.
ATTORNEYS.

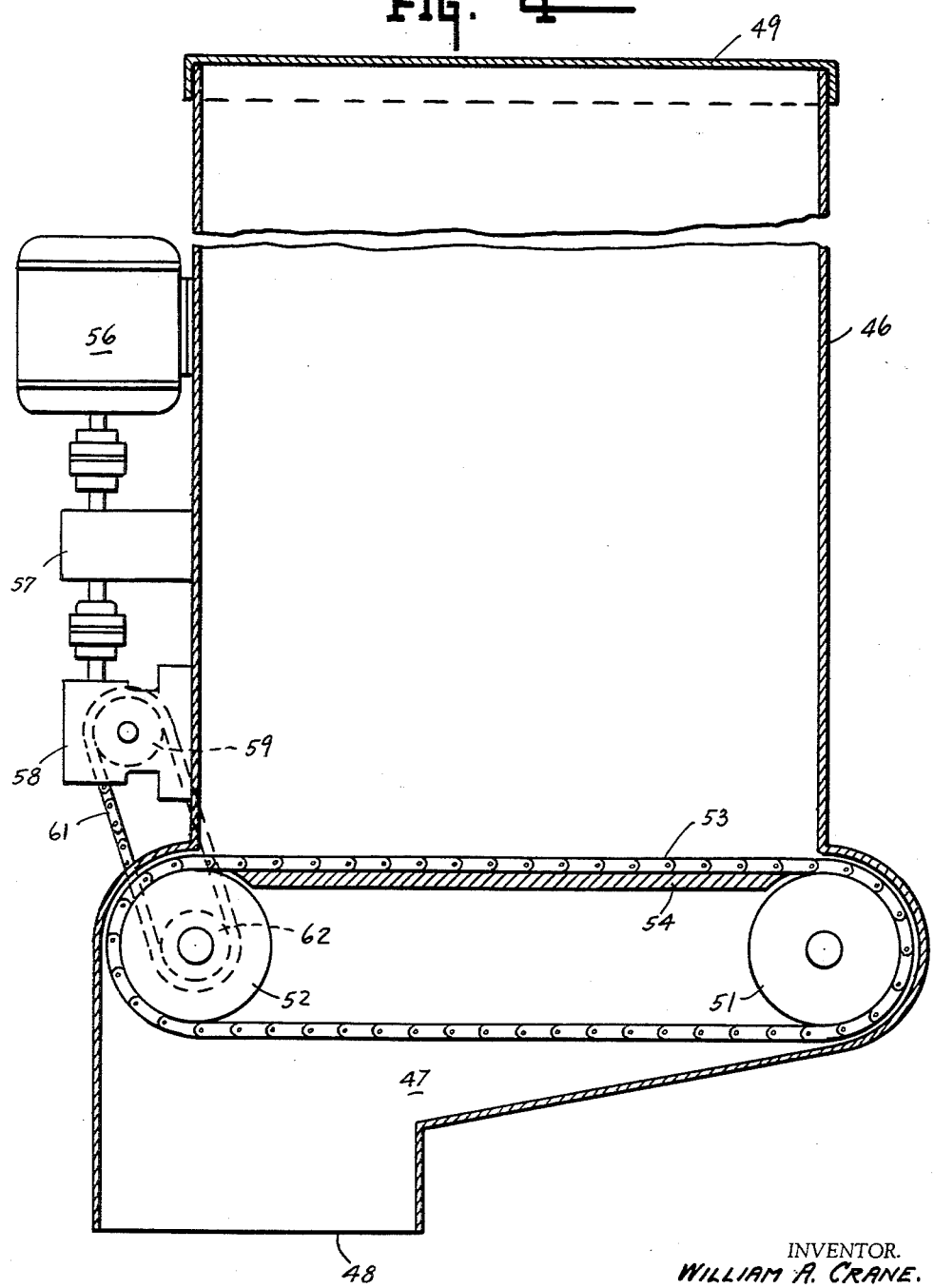

United States Patent Office 2,940,644
Patented June 14, 1960

2,940,644

FEEDER FOR FILTERING MATERIALS

William A. Crane, Lebanon, Ind., assignor, by mesne assignments, to Indiana Commercial Filters Corporation, Lebanon, Ind., a corporation of Indiana Filed July 22, 1957, Ser. No. 673,223

2 Claims. (Cl. 222—345)

This invention relates generally to devices for dispensing metered amounts of friable, comminuted material, and in particular to devices of this type adapted for feeding a measured quantity of filtering material to a filtering solution or slurry.

It is conventional to filter cooling oils and cutting solutions, used with machine tools, to thereby remove any metallic particles or other foreign matter after the cooling oil or cutting solution has been applied to the tools of metal working machines, such filtering making it possible to circulate the cooling oil or cutting solution repeatedly over the cutting tools. In order to remove from the cooling oil or cutting solution so-called "fines," which are in the nature of powdered metal, it is necessary to add to the cooling oil or cutting solution, within the filtering mechanism itself, accurately measured amounts of a filter aid which is in the nature of a friable, comminuted material such as diatomaceous earth. This material coats the conventional filter surface thereby blocking the passage of "fines" but still permitting passage of cooling oil or other coating solution.

It is characteristic of filter aid materials that they are hygroscopic and consequently have a tendency to pack when placed within a container. When it is desired to provide mechanical apparatus for extracting filter aid materials from a container, it is found that they have a tendency to "bridge" whereby a certain amount of the filter aid material may flow out of the container, but after bridging has occurred, flow of the material is stopped.

The principal object of this invention is to provide apparatus adapted accurately and adjustably to dispense predetermined quantities of friable filter aid material into a mixing chamber forming a part of the filtering apparatus.

A further object of the present invention is to provide a dispensing apparatus of the type referred to herein which includes structure adapted to prevent "bridging" of a filter aid material as such material is dispensed therefrom.

In accordance with this invention there is provided a dispensing or metering device consisting of a hopper formed to prevent bridging of a filter aid material contained therein, and a power driven, measuring and discharging apparatus operatively associated with said hopper for discharging material from said hopper at a predetermined and adjustable rate.

The full nature of the invention will be understood from the accompanying drawings and the following description and claims Fig. 1 represents a side view of a feeding apparatus embodying the present invention.

Fig. 2 is an end view of the apparatus shown in Fig. 1.

Fig. 3 is a bottom view of the apparatus shown in Figs. 1 and 2.

Fig. 4 is a side view of a modified form of the feeding apparatus.

Figure 1:
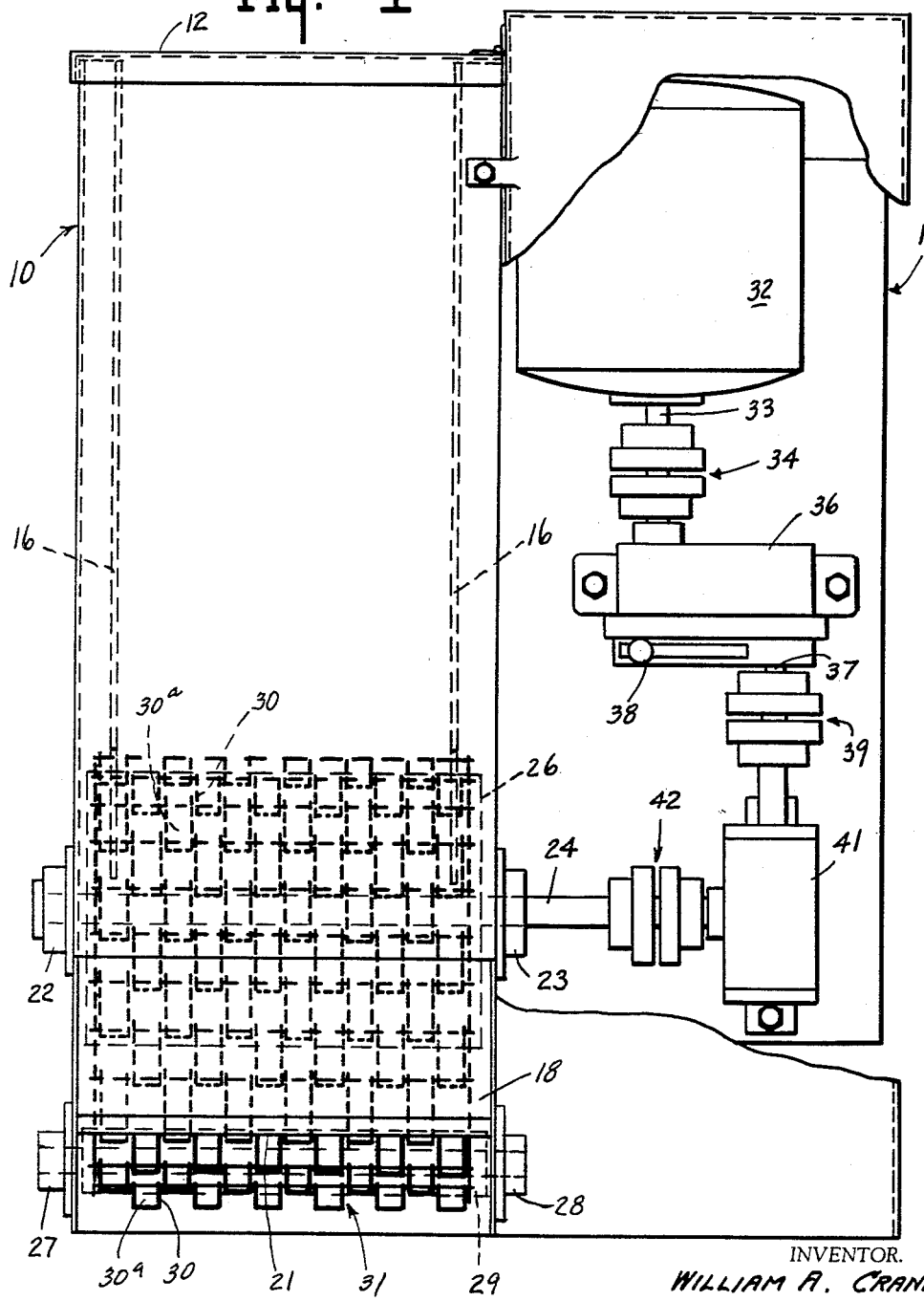

Referring initially to Figs. 1, 2 and 3, the feeding apparatus is comprised of a hopper 10 having attached thereto an enclosure 11 housing the driving means. The hopper is provided with a removable cover 12, and the hopper's inner side walls are formed by a liner generally rectangular in cross section having two pairs of opposed vertical sides 16 (Fig. 1) and 16a (Fig. 2). The sides 16a are formed to provide depending inclined flanges or tongues 17 and 18, these flanges forming a discharge duct or passage 19 terminating in a discharge port 21.

Bearing members 22 and 23 are mounted upon the hopper side walls and journal a shaft 24 upon which is mounted a drum 26. The drum is sized so as to have a generally tangential relation to the adjacent opposed side walls 16a of the hopper and the discharge duct. Bearing members 27 and 28, mounted on the hopper, support for rotation an idler drum 29, generally coextensive with the drum 26 but of considerably smaller diameter and positioned on the outlet side of the discharge port.

An endless, flexible conveyor member or belt 31 extends between the drums 26 and 29, the intermediate sections of the belt travelling closely adjacent the inner surfaces of the flanges 17 and 18. As may best be seen in Fig. 1, the conveyor member is formed by a series of staggered, U-shaped elements 30, pivotally joined on an axis parallel to the axis of rotation of the drum. This belt or chain structure, thus provides a series of chambers 30a which, when the drum is rotated, travel across the hopper and are filled with the material to be delivered to the hopper discharge port. Bridging of the filter aid material is prevented by the structure described herein where the vertical walls offer minimum resistance to downward movement of the material and the drum and chain present to the material a moving irregular surface extending from wall to wall of the hopper.

The means for driving the drum 26 is housed within the enclosure 11 and includes an electric motor 32 having an output shaft 33, which, by means of coupling 34, is joined to a variable speed reducer 36. The speed of rotation of the output shaft 37 of the speed reducer may be adjusted by means of manually operated adjusting element 38. The output shaft of the speed reducer is connected, by means of coupling 39, to a worm gear and wheel assembly housed in the casing 41, and the output shaft of this assembly is connected by means of coupling 42 to the drum shaft 24.

In operation, the hopper 10 may be filled with a filter aid material and, with the driving means rotating the drum at the desired speed, the chambers 30a formed in the belt will be filled with the filter aid material as they traverse the width of the hopper. In moving past the tagential area between the drum and the hopper side walls, the contents of the chambers will be "topped," thereby delivering an accurately measured volume of material from each chamber as it traverses the idler drum. It will be evident that by adjustably increasing or decreasing the speed of rotation of the drum 26, material may be metered and fed from the hopper to the discharge port at a selected rate. The relatively steep flexure required of the belt as it passes over the idler drum 29 insures the emptying of each of the chambers provided in the belt.

The modified form of the apparatus, shown in Fig. 4, includes a hopper 46 formed at its base to provide a discharge duct 47 and a discharge port 48. A hinged, or otherwise removable, cover 49 closes the upper end of the hopper. Two identically sized drums 51 and 52 are horizontally mounted for rotation within the discharge duct, the mounting for the drums being positioned so that the drums are closely adjacent, over a portion of their surface, to the side walls of the discharge duct which are shaped to accommodate the drums. Extending between the drum is a conveyor member or belt 53, formed similarly to the belt 31 shown in Fig. 1. A supporting plate 54, mounted upon the hopper side walls, extends beneath the upper section of the belt and is positioned generally at the interface of the hopper and the discharge duct.

The driving means for the drums comprises an electric motor 56 connected through a variable speed reducer 57 and a worm gear and wheel assembly 58 to a drive sprocket 59. A drive chain 61 extends between the sprocket 59 to a driven sprocket 62 which is keyed to the drive shaft for the drum 52, the drum 51 serving as an idler.

In operation, with the drums rotating, the chambers provided within the belt fill with the material to be dispensed as the belt traverses the supporting plate 54. As the belt moves through the tangential area between the drum and the discharge duct sidewalls, the material in the chambers will be thereby "topped," each chamber thus delivering an accurately measured volume of material to the discharge port. As was the case in the form of the invention previously described, by adjustably varying the speed of rotation of the drum 52, material may be delivered from the hopper to the discharge port at a selected rate. The filter aid material which is dispensed by the apparatus of this invention may comprise a dry or powdered material or it may comprise such a material which is mixed with water in varying amounts before it is dispensed. One of the advantages of this invention is that it will handle filter aid material in either of the above mentioned forms without bridging or other impediment of flow.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An apparatus for metering comminuted material comprising a vertically side walled hopper having a discharge duct, a horizontally mounted rotatable drum extending across the discharge duct and disposed so that said hopper side walls extend generally tangential to the periphery of said drum, a rotatable idler member having its axis of rotation disposed exteriorly of said duct but adjacent thereto, said idler member having an appreciably smaller diameter than said drum, means for delivering a predetermined quantity of material from the hopper through said discharge duct upon rotation of the drum, said means including an endless conveyor belt extending between said drum and said idler member, the outer surface of said belt being contiguous with the adjacent side walls of the hopper at the areas of tangency of the drum with the hopper side walls, material-receiving chambers formed in said belt for transporting material from the hopper past said contiguous side walls and through said discharge duct as the drum is rotated, and variable speed power means for rotating said drum, the flexing of said belt as it passes over said idler member serving to facilitate the exit of material from said chambers.

2. An apparatus for metering comminuted material comprising a hopper having a discharge duct and vertical side walls, a drum rotatably mounted to extend across the discharge duct and disposed so that said hopper sidewalls extend generally tangential to the periphery of said drum, a rotatable idler member having its axis of rotation disposed exteriorly of said duct but adjacent thereto, said idler member having an appreciably smaller diameter than said drum, means for delivering a predetermined quantity of material from the hopper through said discharge duct upon rotation of the drum, said means including an endless coveyor belt extending between said drum and said idler member, the outer surface of said belt being contiguous with the adjacent side walls of the hopper at the areas of tangency of the drum with the hopper side walls, and material-receiving chambers formed in said belt for transporting material from the hopper past said contiguous side walls and through said discharge duct as the drum is rotated, the flexing of said belt as it passes over said idler member serving to facilitate the exit of material from said chambers.

References Cited in the file of this patent

UNITED STATES PATENTS

| Number | Name | Date |
|---|---|---|
| 514,540 | Bouchard | Feb. 13, 1894 |
| 621,533 | May | Mar. 21, 1899 |
| 2,141,044 | Rassman | Dec. 20, 1938 |
| 2,351,505 | Hagemeyer | June 13, 1944 |
| 2,619,261 | Pick et al. | Nov. 25, 1952 |